(12) United States Patent
Varenberg et al.

(10) Patent No.: US 11,976,708 B2
(45) Date of Patent: May 7, 2024

(54) DRIVE BELT WITH SURFACE TEXTURE FOR MINIMIZING VIBRATIONS

(71) Applicant: Georgia Tech Research Corporation, Atlanta, GA (US)

(72) Inventors: Michael Varenberg, Atlanta, GA (US); Michael Leamy, Atlanta, GA (US); Yingdan Wu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 173 days.

(21) Appl. No.: 17/764,171

(22) PCT Filed: Oct. 17, 2020

(86) PCT No.: PCT/US2020/056194
§ 371 (c)(1),
(2) Date: Mar. 26, 2022

(87) PCT Pub. No.: WO2021/077049
PCT Pub. Date: Apr. 22, 2021

(65) Prior Publication Data
US 2022/0373061 A1    Nov. 24, 2022

Related U.S. Application Data

(60) Provisional application No. 62/923,053, filed on Oct. 18, 2019.

(51) Int. Cl.
*F16G 1/28*  (2006.01)
*B29D 29/00*  (2006.01)
(Continued)

(52) U.S. Cl.
CPC ............. *F16G 1/28* (2013.01); *F16G 1/10* (2013.01); *F16G 1/12* (2013.01); *B29D 29/00* (2013.01)

(58) Field of Classification Search
CPC ..... F16G 1/28; F16G 1/10; F16G 1/12; B29D 29/00
(Continued)

(56) References Cited

U.S. PATENT DOCUMENTS 3,656,360 A * 4/1972 Fix ................. C08G 18/69
156/169
5,022,186 A   6/1991 Rpgers, Jr.
(Continued)

FOREIGN PATENT DOCUMENTS

CN    108290452 B    8/2019
EP       083860 A1 *  4/1998
(Continued)

OTHER PUBLICATIONS

Wu et al.: "Schallamach waves in rolling: Belt drives"; Nov. 9, 2017; Tribology International 119 (2018); p. 354-358.

*Primary Examiner* — Gene O Crawford
*Assistant Examiner* — Emily R Kincaid
(74) *Attorney, Agent, or Firm* — Bryan W. Bockhop; Bockhop Intellectual Property Law, LLC

(57) ABSTRACT

A pulley belt (100) for transmitting force from a first pulley (12) to a second pulley (14) includes a belt member (110) having a contact surface (120) configured to be in contact with the first pulley (12) and the second pulley (14). A plurality of projections (122) extends from the contact surface (120). The projections have a predetermined height/diameter aspect ratio. In a method of making a pulley belt, an uncured elastomer (316) is placed in a mold (310) having a shape of a belt member (320) with an inner surface from which patterned projections (312) extend inwardly. The uncured elastomer is cured to form a cured belt member (320), which is removed from the mold (310).

17 Claims, 2 Drawing Sheets

(51) Int. Cl.
*F16G 1/10* (2006.01)
*F16G 1/12* (2006.01)

(58) Field of Classification Search
USPC .......................................................... 474/237
See application file for complete search history.

(56) References Cited

U.S. PATENT DOCUMENTS

| | | | |
|---|---|---|---|
| 5,397,072 | A | 3/1995 | Schoeppel et al. |
| 6,340,413 | B1 * | 1/2002 | Nilsson ................ D21F 11/006 |
| | | | 162/902 |
| 6,358,030 | B1 * | 3/2002 | Ampulski ............... B29C 43/28 |
| | | | 425/371 |
| 9,464,686 | B2 * | 10/2016 | Kusano ..................... F16G 5/08 |
| 10,280,563 | B2 * | 5/2019 | Burazin ................. B65G 15/54 |
| 2005/0143209 | A1 | 6/2005 | Sjobitamo |
| 2010/0119780 | A1 * | 5/2010 | Schilling .............. A43B 13/223 |
| | | | 428/156 |
| 2011/0114277 | A1 * | 5/2011 | Spitzer ................. D21F 11/006 |
| | | | 162/289 |
| 2014/0364262 | A1 | 12/2014 | Mori et al. |
| 2017/0191545 | A1 * | 7/2017 | Sekiguchi ............. C08G 18/10 |
| 2020/0030124 | A1 | 1/2020 | Bluecher et al. |
| 2020/0155292 | A1 | 5/2020 | Bluecher et al. |

FOREIGN PATENT DOCUMENTS

| | | | | |
|---|---|---|---|---|
| WO | WO 2015/063773 | A1 | 5/2015 | |
| WO | WO-2016134062 | A1 * | 8/2016 | ............. B32B 27/08 |

\* cited by examiner

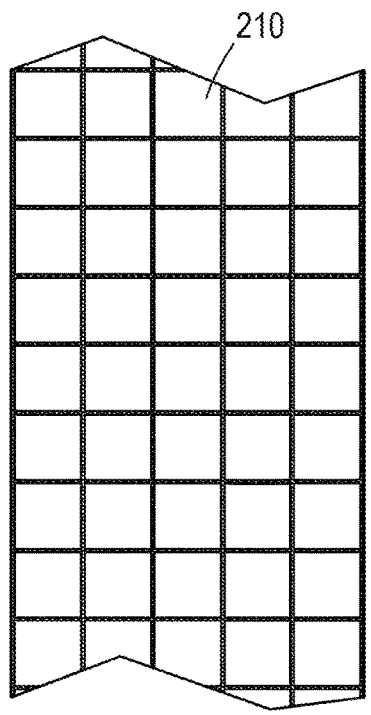
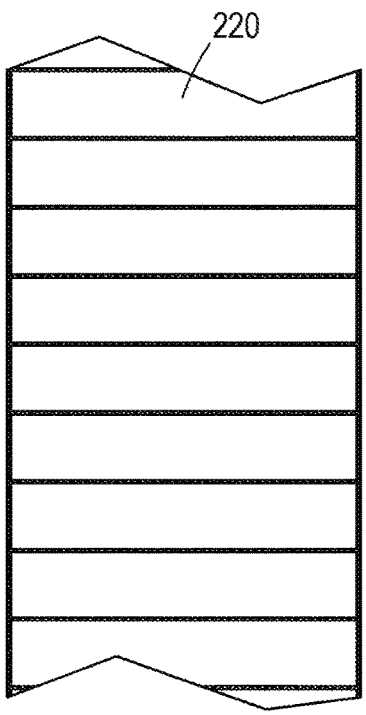
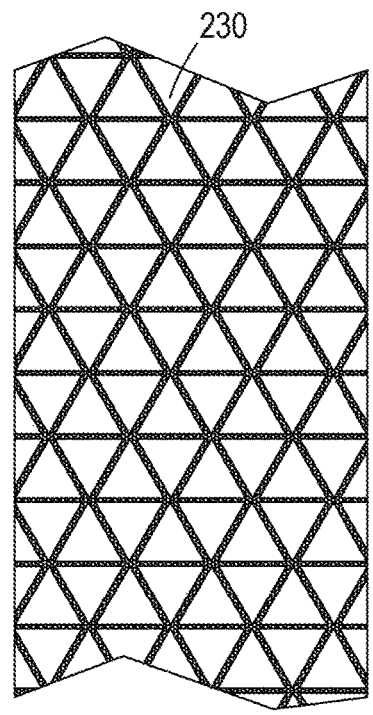
FIG. 4A     FIG. 4B     FIG. 5
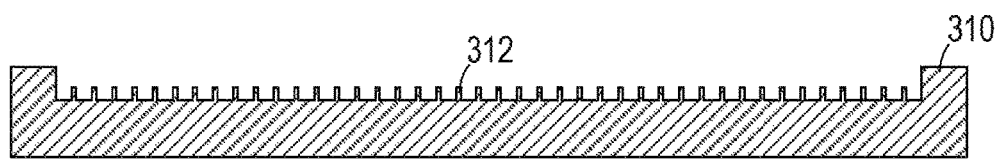
FIG. 6A
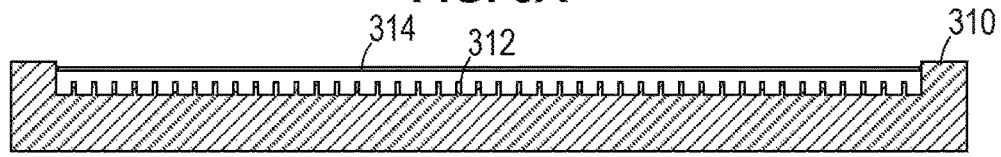
FIG. 6B
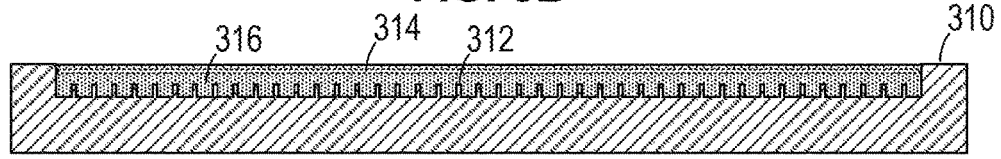
FIG. 6C
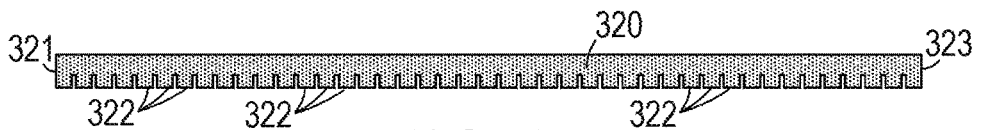
FIG. 6D

DRIVE BELT WITH SURFACE TEXTURE FOR MINIMIZING VIBRATIONS

CROSS-REFERENCE TO RELATED APPLICATION(S)

This application claims the benefit of U.S. Provisional Patent Application Ser. No. 62/923,053, filed Oct. 18, 2019, the entirety of which is hereby incorporated herein by reference.

STATEMENT OF GOVERNMENT SUPPORT

This invention was made with government support under Award Number 1562129 awarded by the National Science Foundation. The government has certain rights in the invention.

BACKGROUND OF THE INVENTION

1. Field of the Invention

The present invention relates to belts of the type used in association with pulley systems and, more specifically, to a belt system that reduces the effects of detachment waves.

2. Description of the Related Art

Pulley belts, are rubber belts wrapped around a set of pulleys that transmit force from one pulley to the other pulleys in the set as part of a belt drive system. Detachment waves have been identified as one of the main sources for self-oscillation and accompanying energy losses in belt drive systems. They tend to be more pronounced in the driver case than in the driven case.

Frictional interactions in both sliding and rolling elastomeric contacts are significantly affected by adhesion. When unable to slide due to stiction, a tangentially loaded elastomeric surface tends to buckle under compression, forming narrow lines of lost contact called "Schallamach waves," which propagate across the interface to allow for relative displacement between the contacting bodies. This uncontrollable and unstable surface behavior is generally undesirable in mechanical systems.

Detachment waves have only recently been observed in belt drives. Analysis of dynamic behavior of a model belt drive reveals that local detachment events at the belt-pulley interface are responsible for global self-oscillation of the system. Moreover, it has also been found that detachment wave-induced instabilities can significantly lower the energy efficiency of a belt drive. Given that belt drives are employed for transmitting mechanical power in numerous engineering applications, there is a need for techniques that can be used for the disruption of detachment waves at the rolling belt-pulley interface.

Chemical modification of a belt surface has been tried to inhibit detachment wave formation. In chemical modification, different functional groups are introduced at the elastomeric surface by treatment with strong acids or chlorinating agents. Atmospheric plasma treatments have also used to introduce adhesion-oriented functional groups on elastomeric surfaces as well as to deposit a plasma polymerized coating on top of. Laser cladding has also recently employed to produce a polymer-based coating on elastomer substrates. However, these methods can be time-consuming, costly and may be based on substances that are not environmentally friendly. Moreover, the large elasticity of many elastomers may make coating them challenging, as it necessitates a strong adhesion over a wide range of strains.

Therefore, there is a need for a simple and inexpensive method of inhibiting detachment waves is belt drive systems.

SUMMARY OF THE INVENTION

The disadvantages of the prior art are overcome by the present invention which, in one aspect, is a pulley belt for transmitting force from a first pulley to a second pulley. The pulley belt includes a belt member having a contact surface configured to be in contact with the first pulley and the second pulley. A plurality of projections extends from the contact surface. The projections have a predetermined height/diameter aspect ratio.

In another aspect, the invention is a pulley belt for transmitting force from a first pulley to a second pulley. The pulley belt includes a belt member having a contact surface configured to be in contact with the first pulley and the second pulley. A regularly patterned plurality of projections extends from the contact surface and has an area density of at least 70% and a 0.2 height/diameter aspect ratio. A plurality of cords is embedded lengthwise through the belt member.

In yet another aspect, the invention is a method of making a pulley belt, in which an uncured elastomer is placed in a mold. The mold has a shape of a belt member having an inner contact surface from which a regularly patterned plurality of projections extends inwardly from the contact surface. The plurality of projections has an area density of at least about 70% and a height/diameter aspect ratio in a range of from 0.01 to 1.0. The uncured elastomer is cured so as to form a cured belt member with an inner surface pattern of projections. The cured belt member is removed from the mold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 4A is a plan view of a first embodiment of a contact surface of a section of a pulley belt with rectangular projections.

FIG. 4B is a plan view of a second embodiment of a contact surface of a section of a pulley belt with rectangular projections.

FIG. 5 is a plan view of an embodiment of a contact surface of a section of a pulley belt with triangular projections.

FIGS. 6A-6D are several views demonstrating a belt molding method.

DETAILED DESCRIPTION OF THE INVENTION

Figure 1:
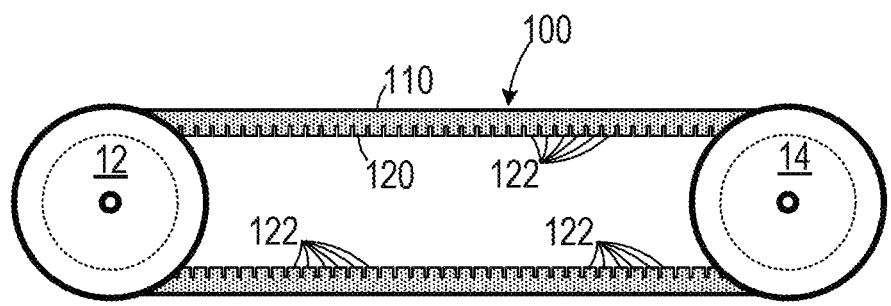
FIG. 1 is an elevational view of one embodiment of a pulley belt.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The invention addresses formation of detachment waves (also known as "Schallamach waves") in a belt that is interacting with a pulley or other surface. It is believed that such waves propagate in a belt interacting with a pulley as a result of uneven contact forces on the contact surface between the belt and the pulley due to areas of non-contact between the belt and the pulley when the belt is under compression or tension. These detachment waves cause local slippage, which reduces the energy efficiency of the belt/pulley system. The invention reduces propagation of detachment waves by locally decoupling contact belt surfaces from each other so that if one part of a contact surface is laterally compressed, it does not pass on that compression to adjacent parts of the contact surface and, as a result, formation of a wave is inhibited.

As shown in FIG. 1, one embodiment of a pulley belt 100 of the type used to transmit force from a first pulley 12 to a second pulley 14 includes a belt member 110 with a contact surface 120 from which a plurality of projections 122 extend. The projections 122 have a predetermined height/diameter aspect ratio so that the projections 122 inhibit formation of detachment waves while the belt 100 is in operation. A plurality of tension cords 124 may also be embedded lengthwise in the belt to add strength. Such cords 124 can include cotton cords, synthetic fiber cords and steel or other metal cables, for example.

Figure 3:
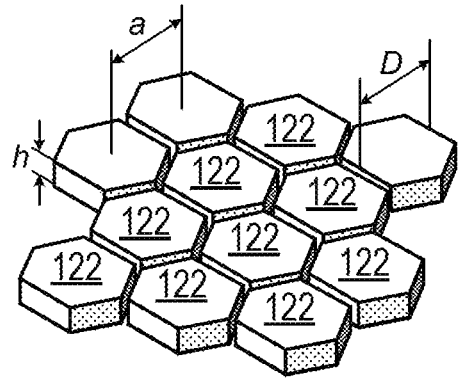
FIG. 3 is a perspective view of several hexagonal projections.
Figure 2B:
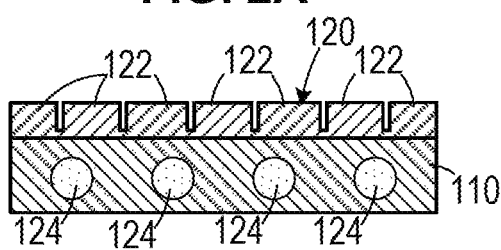
FIG. 2B is a cross-sectional view of the embodiment shown in FIG. 2A taken along line 2B-2B.

As shown in FIG. 3, the predetermined height/diameter aspect ratio of the projections 122 is the ratio of the height (h) to the diameter (D) of the projections 122. (When elongated projections are employed, D is the shortest distance across the projection.) Experimentally, a height/diameter (h/D) aspect ratio in a rage of from 0.01 to 1.0 has been found to be workable. In one embodiment, height/diameter (h/D) aspect ratio of 0.2 has been found to be effective in inhibiting detachment waves. If the aspect ratio of the projections 122 is too high, the belt 100 tends to lose its grip. It has been found that an area density of the projections 122 of about at least 70% is effective. Area density (D/a) can be calculated as the square of the ratio of the diameter (D) over the lattice constant (a). A greater area density $(D/a)^2$ will result in greater surface contact area, but there needs to be sufficient space between the projections to decouple lateral bending due to friction effects between the pullies and each projection from its nearest neighbors.

Figure 2A:
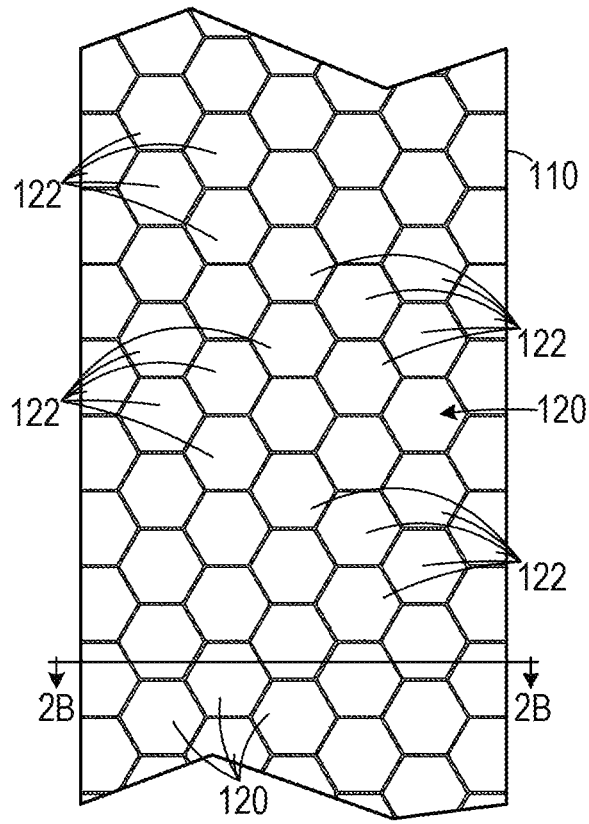
FIG. 2A is a plan view of a first embodiment of a contact surface of a section of a pulley belt with hexagonal projections.

As shown in FIGS. 4A, 4B and 5, the projections can have the form of such regular patterns as a hexagonal pattern (shown in FIG. 2A); a square pattern 210 (shown in FIG. 4A); a rectangular pattern 220 (shown in FIG. 4B) and a triangular pattern 230 (shown in FIG. 5). Many other geometries may also be used. For example, diagonal, diamond-shaped, interlocking T-shaped, etc. can be employed depending upon the specific application. Also, while regular patterns of projections have been shown, irregular patterns, such as irregular patterns, can be employed. Combinations of patterns may also be employed.

Both regular and irregular surface topographies are useful in inhibiting detachment wave vibrations, but regular patterns tend to provide a more pronounced effect because their characteristics can be more readily controlled. The aspect ratio of surface projections was found to be the most important parameter, while excessive texturing of the belt surface can lead loses in a belt's tractive abilities.

As shown in FIGS. 6A-6D. in one method of making a pulley belt of the type disclosed above, a mold 310 having a surface 312 complimentary in shape to the projections and having the shape of a belt member 320 is generated. The mold 310 can be made using one of the many processes well known to the art of mold-making. A cord 314 can be pretensioned and placed in the mold 310. An uncured elastomer 316 is placed in the mold 310. The uncured elastomer 316 is cured so as to form a cured belt member 320 with an inner surface pattern of projections 322 and the cured belt member 320 is removed from the mold 310. Many belts employ circular molds. However, when making long belts, a linear belt member 320 can be generated and the first end 321 of the cured belt member 320 is secured to the opposite end of the cured belt member 323 so as to form a continuous pulley belt in which the projections 322 are directed inwardly.

In one experimental embodiment, the belt specimens were made of a transparent polydimethylsiloxane (PDMS, Sylgard 184, Dow Corning, Midland, MI) elastomer at a 10:1 mixture ratio of Sylgard 184 pre-polymer and its cross-linker. The mixture was cured in light vacuum (to ensure no air bubbles trapped inside the belt) for 14 hours at 65° C. in negative molding templates prepared using four-step molding technique to replicate the topography of either regularly or irregularly textured surfaces. Use of three additional materials (PU, PVS and Epoxy1) was employed to ensure clean demolding. The textured belts were 400 mm in length, 2 mm in thickness, and 10 mm in width.

Replicated surfaces with regular topography were 3D-printed out of Formlabs Clear Resin (Formlabs, Somerville, MA) to have hexagonal and square projections with height h, size D, and lattice constant a. These projections were polished with SiC 2000 grit abrasive paper (Struers, Cleveland, OH) to different heights and a surface roughness Ra of less than 150 nm. All patterned surfaces shared the same area density, $AD=(D/a)^2 \approx 70\%$, while the examined parameters were the lattice constant, a=0.6, 1, 3 mm, the aspect ratio, AR=h/D=0.1, 0.2, 0.3, 0.4, 0.5, and the pattern shape and orientation.

Replicated surfaces with irregular topography were based on SiC abrasive paper sheets of 2000, 1200, 800, 400, 200, 150, and 80 grit (Struers, Cleveland, OH; Lot Fancy Inc, San Francisco, CA). The surface profiles of abrasive papers were characterized using Hommel Etamic W5 profiler (Jenoptik AG, Jena, Germany).

A custom-built tribometer was used in the study. The belt was wrapped around a pulley was drawn at a prescribed constant speed by a driving weight and a releasing motor. The belt loading was adjusted via the tension and torque weights connected to the back end of the belt and the pulley, respectively. Both the driver and driven case scenarios can be implemented by reversing the direction at which the torque is applied to the pulley. Two load cells were attached at the two ends of the belt to measure the belt tension and a rotary encoder was connected to the pulley to track its angular displacement. A digital camera was used to observe the belt/pulley interface.

The driving speed was set to 3 mm/s and the tension at the tight and slack sides of the belt was adjusted to 6 N and 2 N, respectively. The travel distance of the driving stage was 300 mm. The temperature and relative humidity in the laboratory during the tests were 23° C. and 35%, respectively. All statistical tests were performed using one-way ANOVA (all pairwise multiple comparison procedures (Holm-Sidak method), overall significance level 0.05) in the ORIGIN software package (OriginLab Corporation, Northampton, MA).

It was found that self-oscillation of the pulley, which is generated due to contact instabilities and induces large-scale fluctuations in the belt tension difference, was so powerful that the pulley periodically halted, as follows from the angular velocity signal. When the patterned belt with projections were used, the pulley rotated much steadier, and only subtle fluctuations were observed around the prescribed angular velocity (~0.3 rad/s), which also reflected on the fluctuations in the belt tension. As a result of the projections extending from the contact surface of the belt, the size of the detachment zone was greatly reduced (from about 7 mm to about 0.5 mm) when a regular surface pattern was introduced. Also, surface folds (the isolated air-pockets within the contact area), which represent Schallamach waves of detachment, were barely distinguishable on a patterned belt.

Detachment waves in the driver pulley case appeared due to a shear-induced moment generated at the belt exit region. When the belt surface was split into multiple disconnected and independent sub-contacts via patterning, its stiffness was reduced so that much smaller moment was needed to start detachment. Since a shear-induced moment grows until it is relaxed by detachment, the detachment waves had smaller scale and were formed more often, such that the system was excited less violently. In light of this, one can minimize self-oscillation of the belt drive system by modifying the geometrical characteristics of the independent contact elements so as to include projections of the type described above.

The effect of patterning, however, is different for the driver and driven cases. For the driver pulley, the amplitude of oscillation was reduced by a factor of about 3, and the frequency was increased by a factor of about 1.5, while for the driven pulley, the observed effect was much weaker. This can be explained by the difference in the mechanism of detachment. In the former case, the detachment is shear-driven, and surface conditions are vital, while in the latter case it is stretching-driven and the surface conditions are less decisive as volume effects dominate. Another observation is that the oscillations in the driver case became even less pronounced than those in the driven case when the belt surface was textured. This may indicate that the problem of detachment instabilities in belt drives, which to a greater extent is associated with the driver case, can be significantly reduced.

Decreasing the lattice constant (increasing the number of individual sub-contacts) does show some barely noticeable effect, though no statistically significant difference is observed between different patterns in both the driver and driven cases. This is related to the fact that the most significant effect was achieved during initial contact splitting, while further minimization of vibrations required increasing the number of individual sub-contacts by several orders of magnitude. Given that the experimental set-up was limited by the resolution of 3D printing in preparing the molding templates, the finest pattern studied was based on the lattice constant of 0.6 mm, which resulted in about 25 times more individual sub-contacts than in the case of the coarsest pattern with the lattice constant of 3 mm.

In the experimental set-up, the aspect ratio of the hexagonally shaped projections was varied from 0.1 to 0.5. Increasing the aspect ratio from 0.1 to 0.4 led to the increase in frequency and to the decrease in amplitude of the oscillations in both the belt tension difference and the pulley angular velocity. However, a statistically significant effect of aspect ratio was observed only in the driver pulley case, which resulted from the difference in the mechanisms of detachment in the driver and driven cases. In one experiment, a belt patterned to have the aspect ratio of 0.5 was incapable of carrying the prescribed torque in either the driver or the driven pulley.

As the aspect ratio increased, the bending stiffness of the hexagonal projections was reduced. As a result, the projections tend to bend easier under shear traction.

Correspondingly, since the threshold for the formation of detachment waves is easier to reach, the detachment events initiated by the shear-induced moment in the driver case occurred more frequently and had smaller range. However, with a large enough aspect ratio, the projections bent so strongly that their flat ends lost contact with the pulley regardless of the shear direction. This lead to a significant reduction in the real contact area and in the ability to resist shear. Also, the "slip" zone will grow until it takes over the whole belt-pulley interface in both the driver and the driven cases.

The results obtained from the experimental embodiment give rise to the following conclusions: 1. Surface texturing can be successfully employed for minimizing local and global oscillations in belt drive systems, while the effect is much more pronounced in the driver case than in the driven case due to different mechanisms of formation of detachment waves; 2. Both regular and irregular surface topographies are useful in minimizing the belt drive vibrations, but regular surface textures provide stronger effect because their characteristics can be much easier controlled; 3. The aspect ratio of surface projections is found to be the most important parameter, and the lattice constant is found to be less effective, while the pattern shape and orientation tend to show no effect on the belt drive performance; and 4. Too excessive texturing of the belt surface can lead to the belt losing its tractive abilities.

Modern belts often have more complicated profile than just a rectangular one disclosed in the experimental embodiment, such as V and poly-V belts. The use of the projections disclosed herein will work on these belts as well.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A pulley belt for transmitting force from a first pulley to a second pulley, comprising:
   (a) a belt member having a contact surface configured to be in contact with the first pulley and the second pulley;
   (b) a plurality of projections extending from the contact surface, the projections having a predetermined height/diameter aspect ratio in a range of from 0.01 to 1.0,
      wherein the predetermined height/diameter aspect ratio is defined as a height of one of the plurality of projections divided by a diameter of the one of the plurality of projections, wherein the diameter is a shortest distance across the one of the plurality of projections.

2. The pulley belt of claim 1, wherein the predetermined height/diameter aspect ratio is 0.2.

3. The pulley belt of claim 1, wherein the plurality of projections has a regular pattern.

4. The pulley belt of claim 3, wherein the regular pattern has an area density of about at least 70%.

5. The pulley belt of claim 3, wherein the regular pattern comprises selected from a list of patterns consisting of: a hexagonal pattern; a rectangular pattern; and combinations thereof.

6. The pulley belt of claim 1, wherein the plurality of projections comprises a random pattern.

7. The pulley belt of claim 1, wherein the belt member and the plurality of projections comprises an elastomer.

8. The pulley belt of claim 1, further comprising a plurality of cords embedded lengthwise through the belt member.

9. The pulley belt of claim 8, wherein the plurality of cords comprises cotton cords.

10. The pulley belt of claim 8, wherein the plurality of cords comprises metal cords.

11. A pulley belt for transmitting force from a first pulley to a second pulley, comprising:
    (a) a belt member having a contact surface configured to be in contact with the first pulley and the second pulley;
    (b) a regularly patterned plurality of projections extending from the contact surface and having an area density of at least 70% and a 0.2 height/diameter aspect ratio; and
    (c) a plurality of cords embedded lengthwise through the belt member,
       wherein the predetermined height/diameter aspect ratio is defined as a height of one of the plurality of projections divided by a diameter of the one of the plurality of projections, wherein the diameter is a shortest distance across the one of the plurality of projections.

12. The belt of claim 11, wherein the regular pattern comprises selected from a list of patterns consisting of: a hexagonal pattern; a rectangular pattern; and combinations thereof.

13. The belt of claim 11, wherein the belt member and the plurality of projections comprise an elastomer.

14. The belt of claim 11, wherein the plurality of cords comprises tension cords that are subjected to a pretention of substantially 0.1 N during curing of the belt member.

15. A method of making a pulley belt, comprising the steps of:
    (a) placing an uncured elastomer in a mold, the mold having a shape of a belt member having an inner contact surface from which a regularly patterned plurality of projections extend inwardly from the contact surface so that the plurality of projections have an area density of at least about 70% and a height/diameter aspect ratio in a range of from 0.01 to 1.0;
    (b) curing the uncured elastomer so as to form a cured belt member with an inner surface pattern of projections; and
    (c) removing the cured belt member from the mold,
       wherein the predetermined height/diameter aspect ratio is defined as a height of one of the plurality of projections divided by a diameter of the one of the plurality of projections, wherein the diameter is a shortest distance across the one of the plurality of projections.

16. The method of claim 15, further comprising the step of placing a plurality of cords lengthwise in the elastomer and in the mold prior to the curing step.

17. The method of claim 16, further comprising the step of pre-tensioning the plurality of cords prior to the curing step.

* * * * *